United States Patent
Kawamura (10) Patent No.: US 6,386,452 B1
(45) Date of Patent: May 14, 2002

(54) IMAGE READING DEVICE WITH IMPROVED CONTROLLER

(75) Inventor: Kazushige Kawamura, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/448,602

(22) Filed: Nov. 24, 1999

(30) Foreign Application Priority Data

Nov. 26, 1998 (JP) .............................. 10-335909

(51) Int. Cl.[7] .............................. G06K 7/00; G06K 7/10
(52) U.S. Cl. ............. 235/454; 235/462.18; 235/462.24; 235/462.06
(58) Field of Search ............................ 235/454, 462.06, 235/462.18, 462.24

(56) References Cited

U.S. PATENT DOCUMENTS

| | | | |
|---|---|---|---|
| 4,275,423 A | * | 6/1981 | Takahashi et al. ........... 358/285 |
| 4,490,740 A | * | 12/1984 | Moriguchi ................... 358/75 |
| 4,566,040 A | * | 1/1986 | Ozawa et al. ............... 358/293 |
| 4,709,273 A | * | 11/1987 | Honda et al. ............... 358/256 |
| 5,354,977 A | * | 10/1994 | Roustaei ..................... 235/472 |
| 5,430,484 A | * | 7/1995 | Nagane et al. .............. 348/370 |
| 6,278,512 B1 | * | 8/2001 | Tsuji .......................... 355/40 |

FOREIGN PATENT DOCUMENTS

| | | | |
|---|---|---|---|
| JP | 7-6197 | 1/1995 | ............ G06K/7/10 |
| JP | 10-32681 | 2/1998 | ............ H04N/1/04 |
| JP | 411112732 A | * 4/1999 | |

* cited by examiner

Primary Examiner—Karl D. Frech
Assistant Examiner—Daniel Walsh
(74) Attorney, Agent, or Firm—Sughrue Mion, PLLC (57) ABSTRACT

An image reading device is provided in which a number of degrees of freedom in control at a time of reading is increased. A plurality of light emitting elements, which emit light of different wavelengths, are provided in an array, and the array illuminates a photographic film. A plurality of light sensors, which receive light of plural different wavelengths, are provided and receive light transmitted through the photographic film. A controller controls each light sensor, by using a predetermined minimum charging time as a unit, such that, during a charge accumulating time which is an integer multiple of the minimum charge accumulating time, the light sensors receive the light transmitted through the photographic film. The controller controls each light emitting element such that the light emitting elements are pulse width modulated synchronously with the minimum charge accumulating time and such that one period thereof equals the minimum charge accumulating time, and emit light.

11 Claims, 10 Drawing Sheets

IMAGE READING DEVICE WITH IMPROVED CONTROLLER

BACKGROUND OF THE INVENTION

1. Field of the Invention

The present invention relates to an image reading device, and in particular, to an image reading device which reads an original document or image by using a light source which illuminates the original and a light sensor which receives light from the original.

2. Description of the Related Art

There have been proposed various conventional devices in which a plurality of different types of color light are emitted from plural LEDs so as to illuminate an original, and the light reflected from the original is received, as light of a plurality of different wavelengths, by a CCD sensor. For example, Japanese Patent Application Laid-Open (JP-A) No. 10-32681 discloses a reading device in which d plurality of different color lights are successively emitted so as to illuminate an object to be copied, and the light reflected from the object to be copied is read synchronously with the emission of the respective color lights. Further, Japanese Patent Application Laid-Open (JP-A) No. 7-6197 discloses a device in which a bar code is illuminated by light emitted from respective LEDs of an LED array, the light reflected from the bar code is read at a CCD line sensor, and on the basis of the amounts of light received by the respective CCDs, the duties of the period of time that light is emitted from the respective LEDs corresponding to the CCDs are set such that the bar code is illuminated at a uniform and constant amount of light.

In devices such as those described above, in order for the CCD sensor to receive a desired amount of light, the charge accumulating times of the CCD sensor (times at which the CCD sensor can receive light, i.e., light receivable times) must be varied with the plural LEDs always emitting light, or the light emitting times of the plural LEDs must be controlled with the charge accumulating times of the CCDs fixed.

If a method is used in which only one of the charge accumulating times of the CCD sensor or the light emitting times of the LEDs are controlled, not only are there fewer degrees of freedom of control, but also, fine control cannot be effected.

SUMMARY OF THE INVENTION

The present invention was achieved in light of the aforementioned, an object thereof is to provide an image reading device in which the degrees of freedom of control at the time of reading are increased.

In order to achieve the above object, a first aspect of the present invention is an image reading device comprising: a light source which illuminates an original and which is formed by a plurality of light emitting elements which emit light of different wavelengths; one or more light sensors which receive light from the original and which are formed by a plurality of light receiving elements which receive light from the light source; and control means for controlling the light sensors by using a predetermined minimum charge accumulating time as a unit such that the light sensors receive light from the original during a light receivable time which is an integer multiple of the minimum charge accumulating time, and for controlling the respective light emitting elements such that the respective light emitting elements are pulse width modulated synchronously with the light receivable time and such that one period thereof equals the minimum charge accumulating time, and emit light. Light from the light source means both light transmitted through (passing through) the original and light reflected by the original.

In the light source relating to the present invention, a plurality of light emitting elements, which emit light of different wavelengths, are provided in a row, and the light source illuminates the original. In the plural light sensors, plural light receiving elements, which receive light of different wavelengths, are provided in a row, and the plural light sensors receive light from the original.

The control means controls the respective light sensors by using a predetermined minimum charge accumulating time as a unit such that the respective light sensors receive light during a light receivable time which is an integer multiple of the minimum charge accumulating time. The control means controls the respective light emitting elements such that the respective light emitting elements are pulse width modulated synchronously with the light receivable time and such that one period thereof equals the minimum charge accumulating time, and emit light.

By using the predetermined minimum charge accumulating time as a unit, the light sensors receive light from the original during a light receivable time which is an integer multiple of the minimum charge accumulating time. The respective light emitting elements are pulse width modulated synchronously with the light receivable time and such that one period thereof equals the minimum charge accumulating time, and emit light. Thus, the number of degrees of freedom in control at the time of reading can be increased, and fine control can be carried out.

On the basis of output from the plurality of light sensors in a state in which there is no original in a case in which transmitted light from the original is to be read, and on the basis of output from the plurality of light sensors when a reference plate of a predetermined color is set instead of the original in a case in which light reflected from the original is to be read, the control means may compute a target value of at least one of a light receivable time of each of the plurality of light sensors and a light emitting pulse width of each of the plurality of light emitting elements, such that color balance and light distribution of each of the plurality of light emitting elements fall within allowable ranges, and the control means may effect control such that the at least one of the light receivable time of each of the plurality of light sensors and the light emitting pulse width of each of the plurality of light emitting elements becomes the computed target value.

In this way, the control means computes a target value of at least one of a light receivable time of each of the plurality of light sensors and a light emitting pulse width of each of the plurality of light emitting elements, such that color balance and light distribution of each of the plurality of light emitting elements fall within allowable ranges, and the control means effects control such that the at least one of the light receivable time of each of the plurality of light sensors and the light emitting pulse width of each of the plurality of light emitting elements becomes the computed target value. Thus, light of a color balance and light distribution which fall within allowable ranges can be illuminated onto the original.

The control means may control the light receivable time of each of the plurality of light sensors and the light emitting pulse width of each of the plurality of light emitting elements, such that the amount of light received from the original by each of the plurality of light sensors becomes a desired amount of light received.

The control means computes a target value of at least one of the driving current of each of the plurality of light emitting elements, the light receivable time of each of the plurality of light sensors and the light emitting pulse width of each of the plurality of light emitting elements, such that color balance and light distribution of each of the plurality of light emitting elements fall within allowable ranges, and the control means effects control such that the at least one of the driving current of each of the plurality of light emitting elements, the light receivable time of each of the plurality of light sensors and the light emitting pulse width of each of the plurality of light emitting elements becomes the computed target value. Thus, the number of degrees of freedom in control at the time of reading can be increased even more, and even more fine control can be carried out.

The control means may control the light receivable time of each of the plurality of light sensors, the light emitting pulse width of each of the plurality of light emitting elements, and the driving current of each of the plurality of light emitting elements, such that the amount of light received from the original by each of the plurality of light sensors becomes a desired amount of light received.

The light source may be formed by the light emitting elements being arranged on a substrate, and the image reading device may further comprise: detecting means for detecting a temperature of the substrate; and temperature changing means for changing the temperature of the substrate, wherein on the basis of the temperature detected by the detecting means, the control means controls the temperature changing means such that the temperature of the substrate becomes a standard temperature. substrate, the temperature of the substrate can be made to be a reference temperature. Therefore, the LEDs can be maintained at the reference temperature. Thus, the LEDs can emit, at the same amount of emitted light, light of wavelengths at the time the LEDs are at the reference temperature.

Another aspect of the present invention is an image reading device comprising: a light source which illuminates an original document or image to be read and which is formed by a plurality of light emitting elements which emit light; a light sensor which receives light from the original; and control means for controlling a light receivable time and a turning on-and-off period such that the period for turning each light emitting element on and off is 1/n, n being an integer, of a predetermined minimum charge accumulating time and the light receivable time of the light sensor is a time which is greater than or equal to the minimum charge accumulating time and is an amount of time over which light, of an amount generated by a light emitting element being turned on a number of times which is an integer, can be received. In accordance with this aspect, both, on the one hand, the light receivable time of the light sensor, and, on the other hand, the period over which the light emitting elements are turned on and off and/or the light emitting pulse width, are controlled. Therefore, as compared with a case in which only the light receivable time is controlled or a case in which only at least one of the period for turning on and off the light emitting element and the light emitting pulse width is controlled, the number of degrees of freedom of control for receiving a predetermined amount of light is increased, and more fine control can be carried out. Further, the light receivable time means the time over which the light sensor is set in a light receivable state, e.g., the time over which the electronic shutter disposed between the light emitting elements and the light sensor is opened, i.e., the time over which charge can be accumulated. The minimum charge accumulating time is the minimum time over which the light receivable time can be controlled, e.g., the minimum time over which opening of the electronic shutter can be controlled.

In this aspect, the control means may compute a target value of at least one of the light receivable time of the light sensor and the light emitting pulse width of each of the light emitting elements, and control the light receivable time and the turning on-and-off period such that the at least one of the light receivable time of the light sensor and the light emitting pulse width of each of the light emitting elements becomes the computed target value.

In addition, the control means may be structured so as to be able to control the driving current to the light emitting elements.

Further, light emitting diodes (LEDs) may be used for the light emitting elements.

DESCRIPTION OF THE PREFERRED EMBODIMENTS

A first embodiment of the present invention will be described in detail hereinafter with reference to the drawings.

Figure 1:
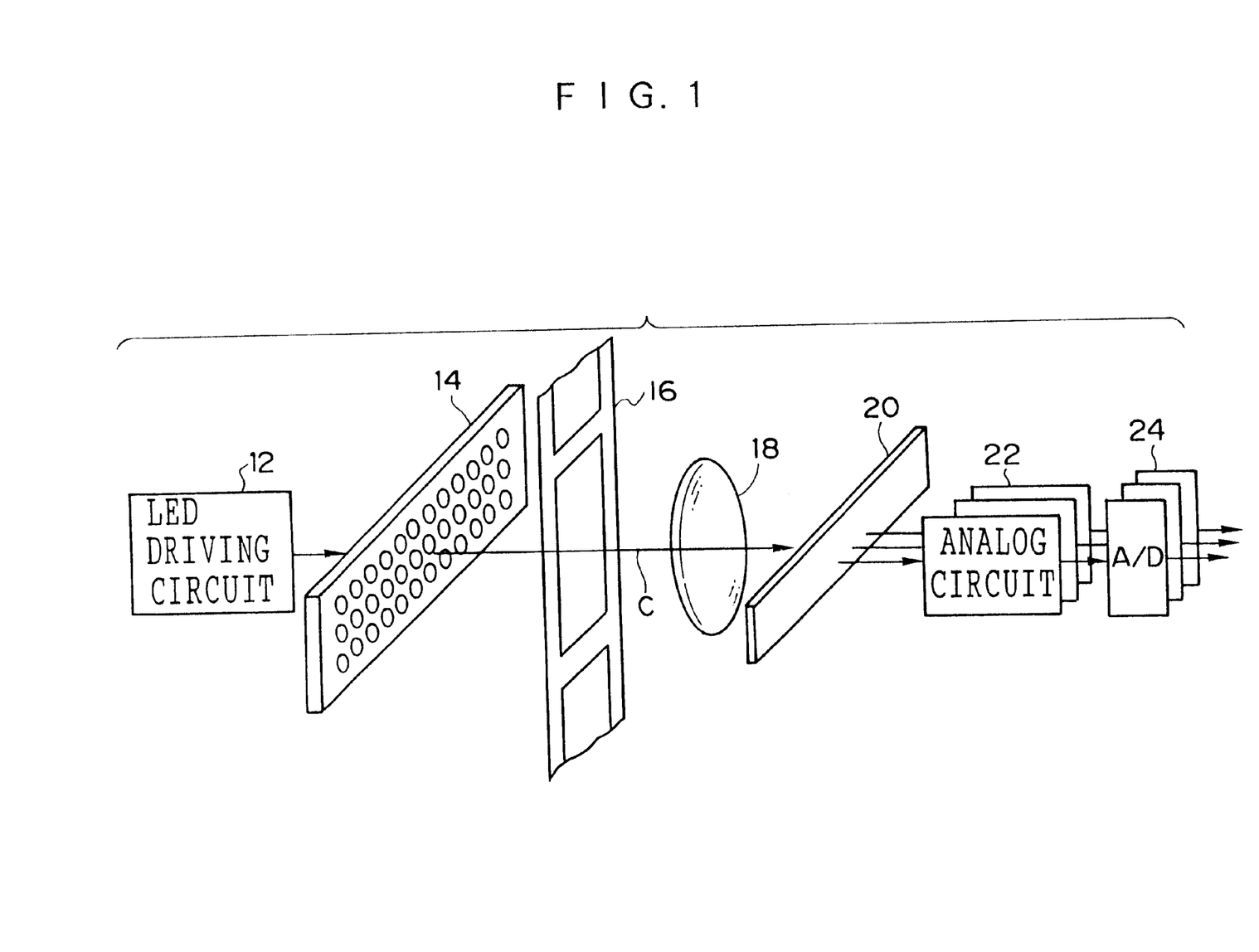
FIG. 1 is a schematic perspective view of an image reading device relating to a first embodiment of the present invention.

As illustrated in FIG. 1, an image reading device relating to the present first embodiment includes an RGB LED array 14 which includes groups of LEDs which emit light of respectively different wavelengths. In the present embodiment, the RGB LED array 14 has three LED groups which emit R light, G light and B light. The RGB LED array 14 is driven by an LED driving circuit 12 to illuminate a photographic film 16. Each of the three LED groups are disposed such that the LEDs thereof are aligned in a row. A temperature sensor and a heater (neither of which are illustrated in FIG. 1) are provided at the substrate at which the LEDs are disposed at the RGB LED array 14.

A lens 18 and a three-line CCD sensor 20 are disposed on the optical axis C of the RGB LED array 14 in that order from the side near the RGB LED array 14. The lens 18 focuses the light transmitted through the photographic film 16. The three-line CCD sensor 20 is a light sensor of plural lines which receive light of respectively different wavelengths (the transmitted light focussed by the lens 18).

In the present embodiment, the three-line CCD sensor 20 includes three CCD lines which receive R light, G light and B light. The line directions of the three CCD lines correspond to the line directions of the three LED groups which emit R light, G light and B light at the RGB LED array 14. The three-line CCD sensor 20 has an electronic shutter function for each line. Analog circuits 22 are connected to the three-line CCD sensor 20 in correspondence with the three lines thereof, and analog/digital (A/D) converters 24 are connected to the analog circuits 22.

Figure 2:
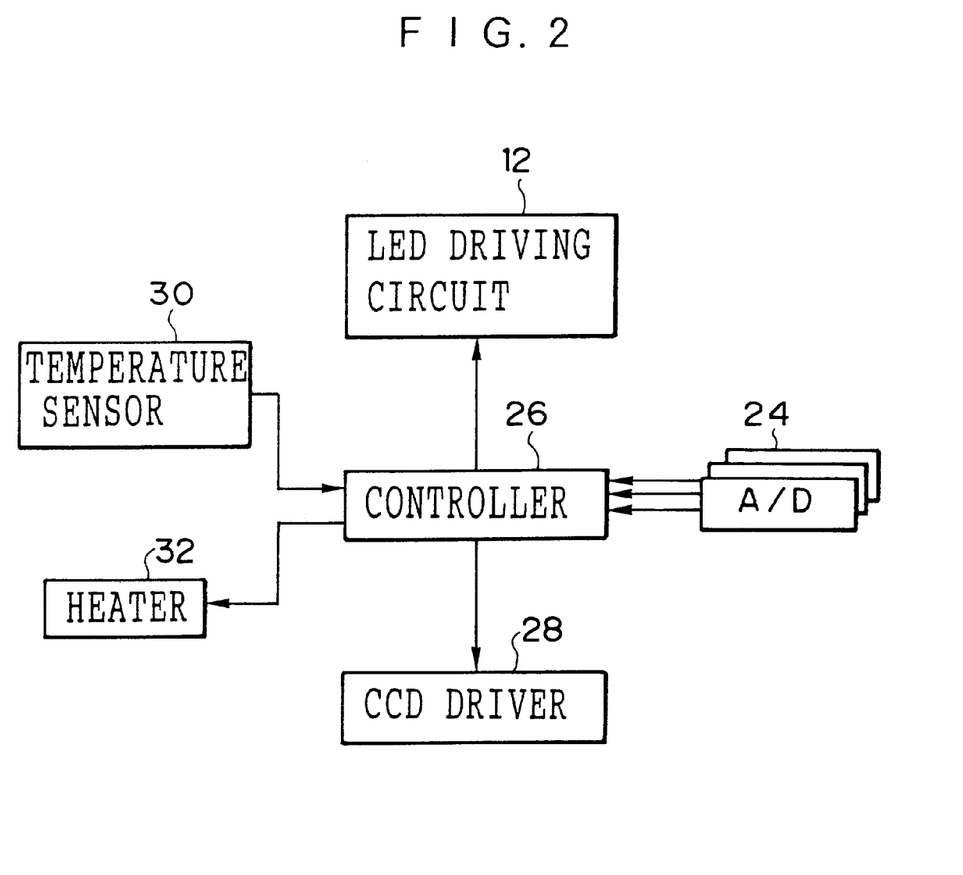
FIG. 2 is a block diagram of the image reading device relating to the first embodiment.

As illustrated in FIG. 2, the control system of the image reading device of the present first embodiment includes a controller 26. A temperature sensor 30 and a heater 32, which were mentioned previously, are connected to the controller 26. The LED driving circuit 12, the A/D converters 24, and a CCD driver 28 which drives the three-line CCD sensor 20 are connected to the controller 26.

Figure 3:
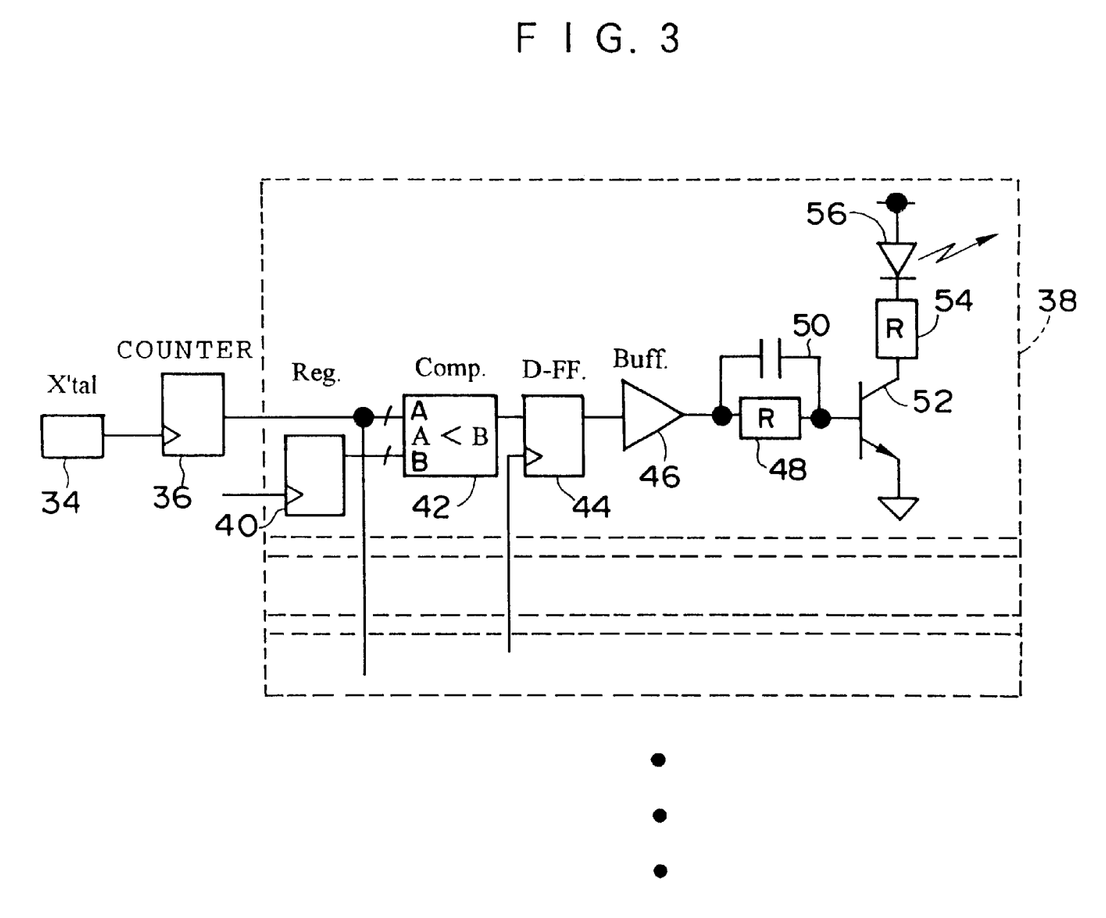
FIG. 3 is a circuit diagram of an LED driving circuit.

As illustrated in FIG. 3, the LED driving circuit 12 includes a crystal oscillator 34, a counter 36, and plural PWM modulating circuits 38. The counter 36 counts signals outputted from the crystal oscillator 34, and outputs a signal corresponding to the count value. When the count reaches an upper limit value, the counter 36 is reset and begins counting anew. The plural PWM modulating circuits 38 are provided in correspondence with the respective LEDs. Because the respective PWM modulating circuits 38 have the same structure, description of only one will be given hereinafter, and description of the rest will be omitted. The PWM modulating circuit 38 includes a register 40, a comparator 42, a resistor 48, a capacitor 50, and a transistor 52. At the register 40, a predetermined value is set by the controller 26 (see FIG. 2), and the register 40 outputs a signal corresponding to the set predetermined value. The comparator 42 is provided with a first input terminal (not shown), to which a signal corresponding to the count value from the counter 36 is inputted, and a second input terminal (not shown), to which the signal corresponding to the predetermined value from the register 40 is inputted. The comparator 42 compares the values expressed by the signals inputted to the first input terminal and the second input terminal, and outputs a signal in the case in which the value expressed by the signal inputted to the first input terminal is lower than the value expressed by the signal inputted to the second input terminal. The collector of the transistor 52 is connected to an LED 56 via a resistor 54, and the base of the transistor 52 is connected to the output terminal of the comparator 42 via the resistor 48 and the capacitor 50, which are connected to the transistor 52 in parallel, and via a buffer 46 and a D-FF 44.

Next, operation of the present embodiment will be described. In a state in which the photographic film 16 is conveyed by an unillustrated conveying means in a direction orthogonal to the direction of the three CCD lines, the LED driving circuit 12 effects pulse width modulation (PWM) for the respective LEDs as will be described later. The light emitted from the LEDs is illuminated onto the photographic film 16. The transmitted light which has passed through the photographic film 16 is focused onto the three-line CCD sensor 20 by the lens 18. Namely, while the photographic film 16 is being conveyed, the images of the image frames recorded on the photographic film 16 are read. In the present embodiment, the photographic film 16 is conveyed reciprocally. During the forward conveying, the images of the image frames recorded on the photographic film 16 are subjected to a preliminary reading (prescanning). On the basis of the densities of the images of the image frames obtained by the prescanning, the reading conditions, such as the charge accumulating times (light receivable times), are computed. Main reading (fine scanning) of the images of the image frames is then carried out in accordance with the computed reading conditions.

Here, in the present embodiment, because the charge accumulating times of the three-line CCD sensor 20 and the light emitting times of the respective LEDs are pulse width modulated, there is the need to prevent fluctuations (e.g., flickering), among the respective reading periods, in the amount of light received buy the three-line CCD sensor 20 during the charge accumulating time which is determined in accordance with the density of the image. Further, the color balance and the light distribution of each LED must be regulated. Moreover, the wavelengths and the light amounts of the emitted color lights vary in accordance with the temperatures of the respective LEDs, and there is the need to prevent such variation. In light of these circumstances, the following control is effected in the present embodiment.

At the three-line CCD sensor 20, the electronic shutters at the respective lines are controlled, by using as a unit an arbitrary minimum charging time T (see FIG. 4) determined from the time over which the respective CCDs can be driven or the time over which the LEDs can emit light or the like, such that the light transmitted through the photographic film 16 is received for a charge accumulating time which is an integer multiple of the minimum charge accumulating time. The minimum charge accumulating time T is determined as follows. First, the range of exposure control is determined, and the amount of received light in one step is determined. Then, the open time of the CCD electronic shutter is set to a value which does not present problems with respect to the response of the CCD electronic shutter, and the turning on-and-off period of the LEDs and the light emitting pulse width are determined such that the amount of light received in one step can be received at the CCD. It is confirmed whether either of the LED turning on-and-off period and the light emitting pulse width are unreasonable, and if both are reasonable, the open time of the CCD electronic shutter at this time is the minimum charge accumulating time T. If one or more of these values are unreasonable, the range of exposure control is lowered, and the minimum charge accumulating time T is again determined by the above processes.

Figure 4:
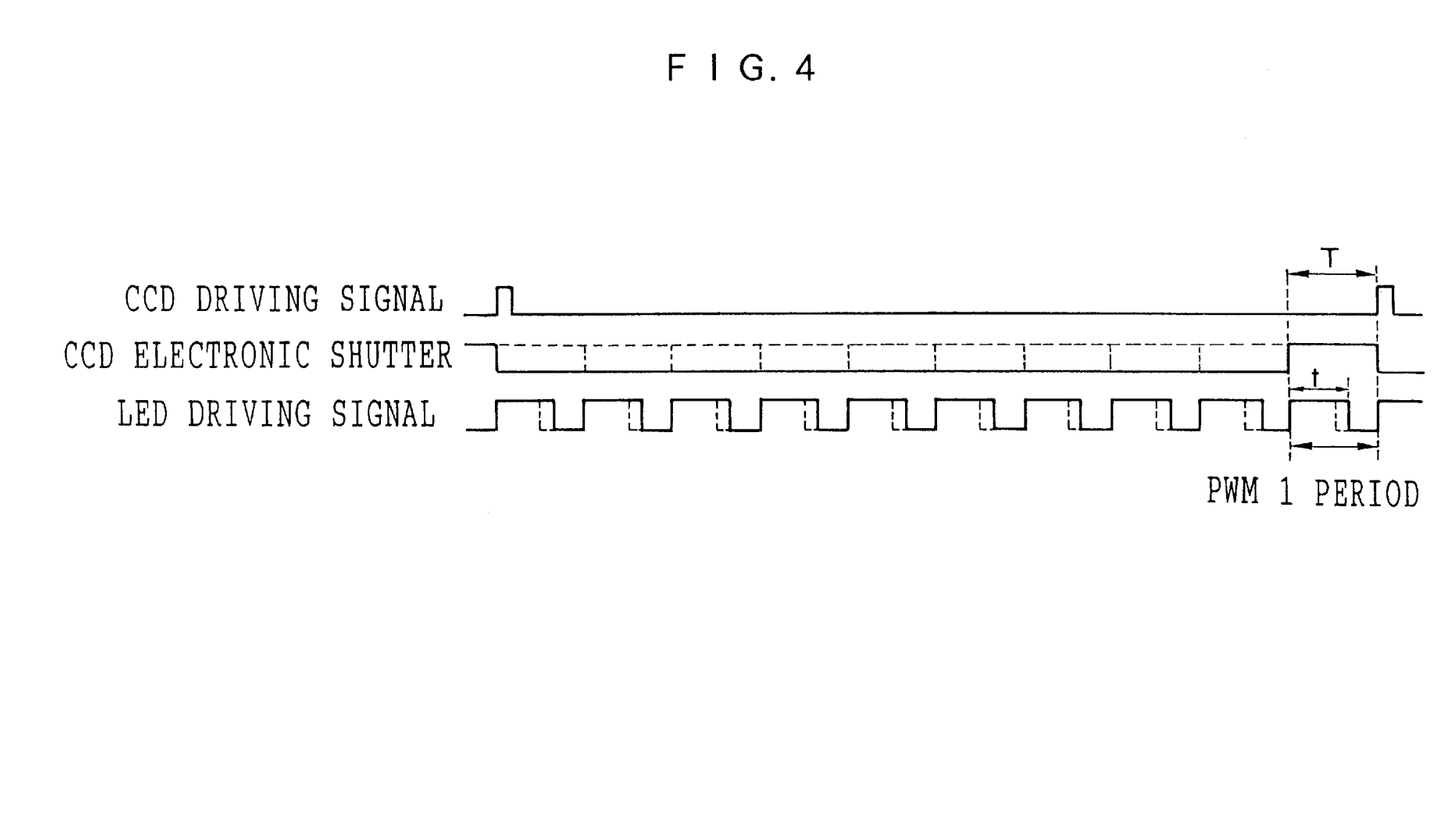
FIG. 4 is a timing chart of the image reading device relating to the first embodiment.

In the present embodiment, as illustrated in FIG. 4, one period of the electronic shutter is an integer multiple of the minimum charge accumulating time T.

At the LED driving circuit 12, the respective LEDs are pulse-width modulated synchronously with the minimum charge accumulating time and such that one period thereof equals the minimum charge accumulating time. Namely, the counter 36 is reset when the CCD driving signal is inputted thereto, and is reset when it has counted up to a pulse number corresponding to the minimum charge accumulating time T, e.g., up to 100 pulses (the upper limit value). The controller 26 computes the light emitting time t (see FIG. 4) within the respective minimum charge accumulating times, such that the desired amount of received light can be obtained during the charge accumulating time which is determined on the basis of the density of the image frame to be read next. The controller 26 sets a value (e.g., 50) corresponding to the computed light emitting time in the register. As illustrated in FIG. 4, the controller 26 outputs a CCD driving signal to the CCD driver 28 and to the counter 36 of the LED driving circuit 12. The counter 36, to which the CCD driving signal is inputted, is reset, and begins to count the pulse signals from the liquid crystal oscillator, and as described above, outputs to the comparator 42 a signal corresponding to the count value. The controller 26 instructs the register 40 to output to the comparator 42 a signal corresponding to a value (e.g., 50) corresponding to the light emitting time. The comparator 42 compares the signal corresponding to the count value with the signal corresponding to the value (e.g., 50) corresponding to the light emitting time t, and outputs a signal in a case in which the count value is less than the value corresponding to the light emitting time t. This signal is inputted to the base of the transistor 52 via the D-FF 44, the buffer 46, the resistor 48, and the capacitor 50. Therefore, during the time when the count value of the counter 36 is less than the value corresponding to the light emitting time t, the transistor 52 is on, and driving current flows to the LED so that the LED emits light. Then, when the count value of the counter 36 becomes greater than or equal to the value corresponding to the light emitting time t, the transistor 52 is turned off, and the LED is turned off. Because the counter 36 is structured such that, as described above, it is reset when it counts to a pulse number (e.g., 100 pulses) corresponding to the minimum charge accumulating time T, when the counter 36 counts to 100, the LED emits light again. In this way, the LED driving circuit 12 pulse-width-modulates the respective LEDs synchronously with the minimum charge accumulating time T and such that the minimum charge accumulating time T is one period.

Then, as illustrated in FIG. 4, the CCD driver 28 opens the electronic shutter from the time the CCD driving signal is inputted to the time that the next CCD driving signal is inputted when the remaining time in the charge accumulating time is within the minimum charge accumulating time. Namely, the electronic shutter is opened during the charge accumulating time. When the electronic shutter is opened, the respective LEDs are pulse-width-modulated by the LED driving circuit 12 as described above, and emit light such that the desired amount of received light is obtained.

In this way, at the three-line CCD sensor 20, the electronic shutters are controlled, by using the minimum charge accumulating time as a unit, such that the light transmitted through the photographic film 16 is received for a charge accumulating time which is an integer multiple of the minimum charge accumulating time, and the LED driving circuit 12 pulse-width-modulates the respective LEDs synchronously with the minimum charge accumulating time and with the minimum charge accumulating time T as one period. Therefore, the amount of light received by the three-line CCD sensor 20 can be freely and optimally controlled.

Namely, fluctuations (e.g., flickering), among the respective reading periods, in the amount of light received by the three-line CCD sensor 20 during the fixed charge accumulating time can be prevented.

In this way, by pulse-width-modulating the charge accumulating times of the three-line CCD sensor 20 and the respective LEDs of the LED driving circuit 12, the amount of light received by each line of the three-line CCD sensor 20 can be controlled freely and optimally. Therefore, diaphragm plates, color balance filters and the like can be eliminated, and the structure can be simplified.

It is possible to modulate either the charge accumulating times of the three-line CCD sensor 20 or the pulse widths of the respective LEDs of the LED driving circuit 12, such that the desired amount of received light, which is set on the basis of the density of the image frame, can be achieved.

Figure 9:
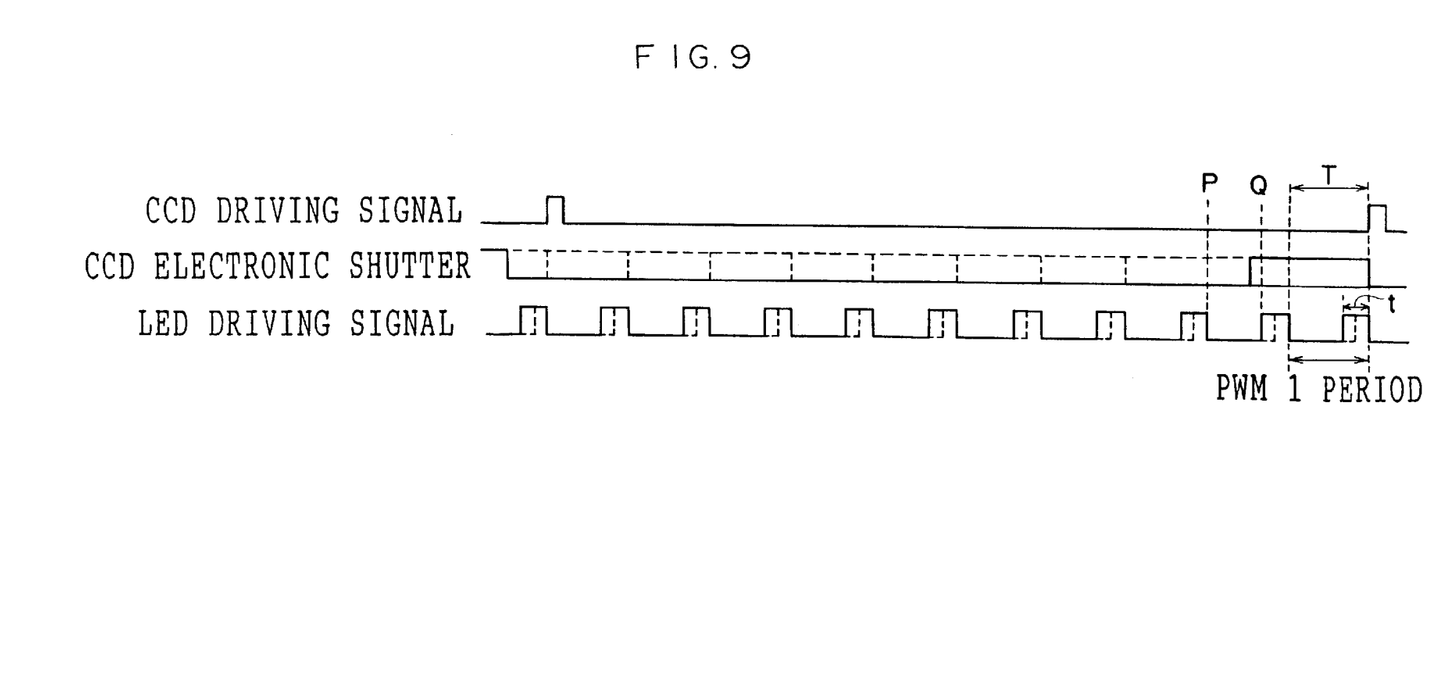
FIG. 9 is a timing chart of an image reading device relating to a modified example.

Further, in the present embodiment, the electronic shutter is controlled, by using the minimum charge accumulating time T as a unit, such that the light passing through the photographic film 16 is received during a charge accumulating time which is an integer multiple of the minimum charge accumulating time T. However, as illustrated in FIG. 9, the charge accumulating time may be a time which is greater than or equal to the minimum charge accumulating time T and over which it is possible to receive light of an amount generated by an LED being turned on a number of times which is an integer. The CCD electronic shutter may be opened during the time the LEDs are off, or at the same time the LEDs are turned off, or at the same time the LEDs are turned on. In the case of the control illustrated in FIG. 9, the CCD electronic shutter is opened and light transmitted through the original is received for an amount of time which is the time over which it is possible to receive an amount of light generated by an LED being turned on twice. In order to receive an amount of light generated by an LED being turned on twice, the CCD shutter opening operation may be completed during the time from P to Q in FIG. 9.

In the present embodiment, as illustrated in FIG. 4, one period of the CCD driving signal for driving the electronic shutter is set to be an integer multiple of the minimum charge accumulating time T. However, one period of the CCD driving signal may be set to be any arbitrary time provided that it is at least the minimum charge accumulating time T. For example, in the example shown in FIG. 10, one period of the CCD driving signal is set to be 9.5T.

Figure 10:
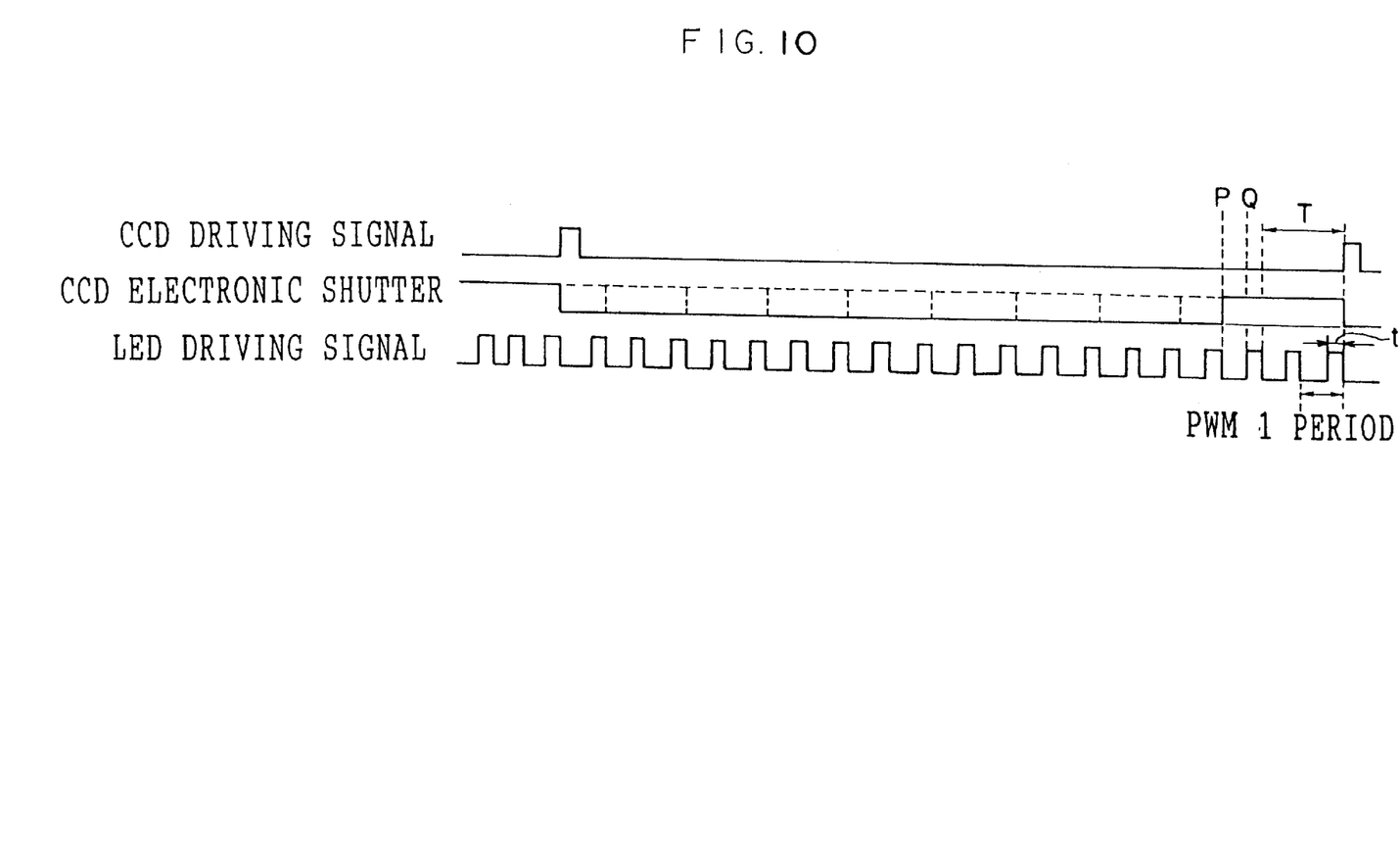
FIG. 10 is a timing chart of an image reading device relating to a modified example.

Moreover, in the present embodiment, as illustrated in FIG. 4, one period of the LED driving signal is set to be the minimum charge accumulating time T. However, pulse width modulation may be carried out such that a time which is an integer multiple of one period of the LED driving signal is the minimum charge accumulating time, i.e., pulse width modulation may be carried out with one period being a time which is 1/n (n is an integer) of the minimum charge accumulating time T. For example, as illustrated in FIG. 10, one period of the LED driving signal may be ½ of the minimum charge accumulating time T and the CCD electronic shutter may be opened and the light passing through the original may be received for a time over which it is possible to receive an amount of light generated by the LED being lit three times.

In the present embodiment, a three line CCD sensor with three CCD linear sensors which receive R light, G light and B light is used. However, the present invention is not limited to the same, and a color area CCD sensor may be used.

In addition, a CCD sensor for black and white may be used, and in this case, lights of different wavelengths are read as follows. As one method, the photographic film is illuminated by turning on the RGB LED array 14 such that R light, G light and B light are illuminated one at a time in that order. During this time, the photographic film is stopped, and the light transmitted through the photographic film is read by the black-and-white CCD sensor for each of the separate color lights. As a second method, by using a spectroscope such as a dichroic prism, the photographic film 16 and the light transmitted through the photographic film are separated into R light, G light and B light, and the respective lights are read by different ones of plural black-and-white CCD sensors.

Figure 5:
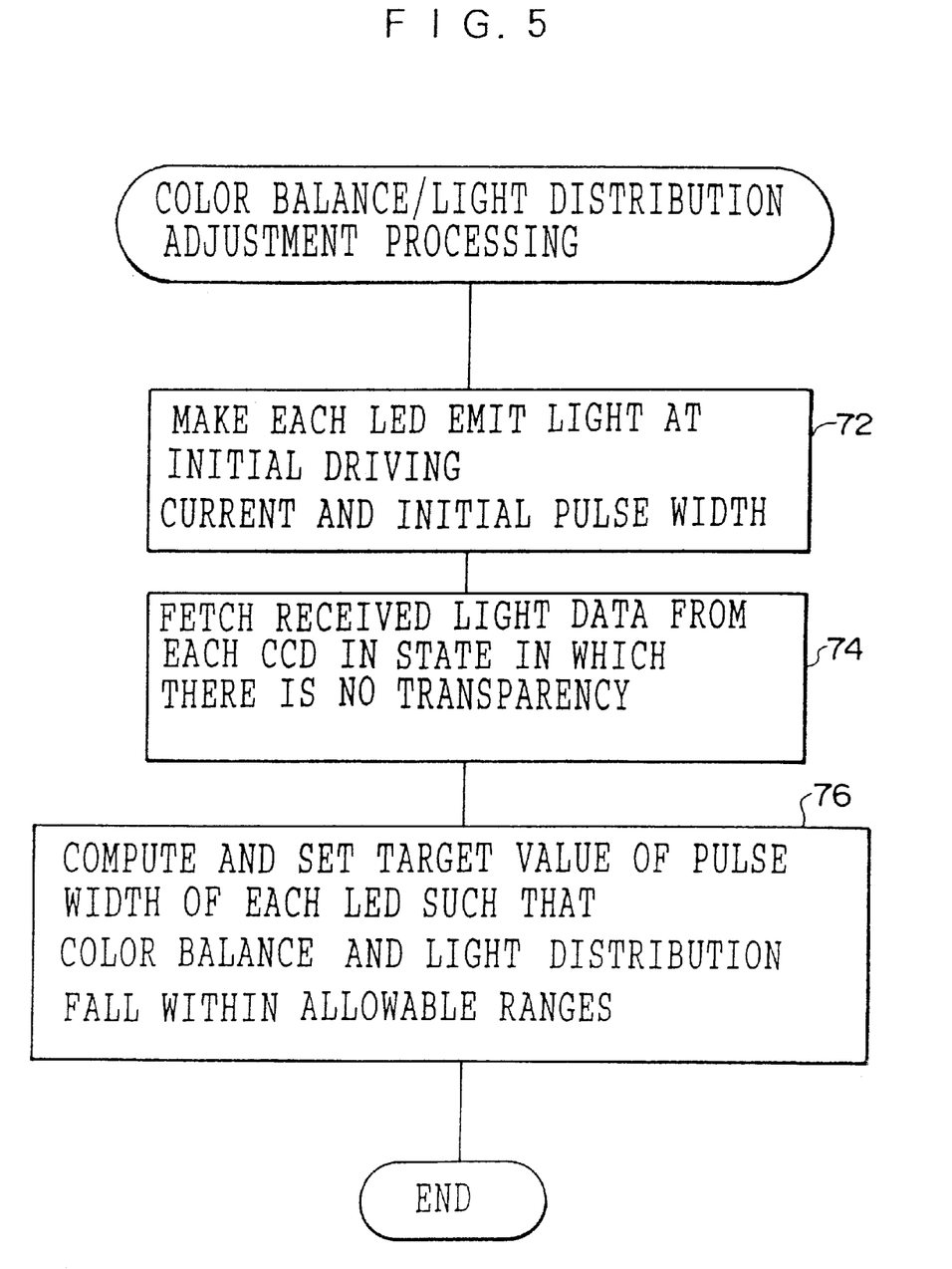
FIG. 5 is a flowchart illustrating a routine of processing for adjusting color balance and light distribution of respective LEDs, which processing is carried out in a state in which there is no transparency.

In the RGB LED array 14, each of the three LED groups which emit the R light, the G light and the B light are arranged in a single row. Therefore, there may be cases in which the color balance or the light distribution of the emitted R light, G light or B light is poor. Thus, in the present embodiment, the color balance and the light distribution are adjusted in advance in a state in which there is no original through which light is transmitted (transparency). Namely, in a state in which there is no transparency, i.e., in a state in which no photographic film 16 is loaded, in step 72 of FIG. 5, the respective LEDs are made to emit light at an initial driving current and an initial pulse width. The light emitted from the respective LEDs is received at the three-line CCD sensor 20, and is inputted to the controller 26 via the analog circuits 22 and the A/D converters 24. In step 74, the received light data of the respective CCDs in the state in which there is no transparency is fetched. In step 76, on the basis of the fetched received light data, target values of the pulse widths of the respective LEDs for making the color balance and the light distribution fall in allowable ranges are computed, and are set in the register 40.

Because target values of the pulse widths of the respective LEDs for making the color balance and the light distribution fall in allowable ranges are computed and set, the photographic film can be illuminated by light whose color balance and light distribution fall within allowable ranges.

Figure 6:
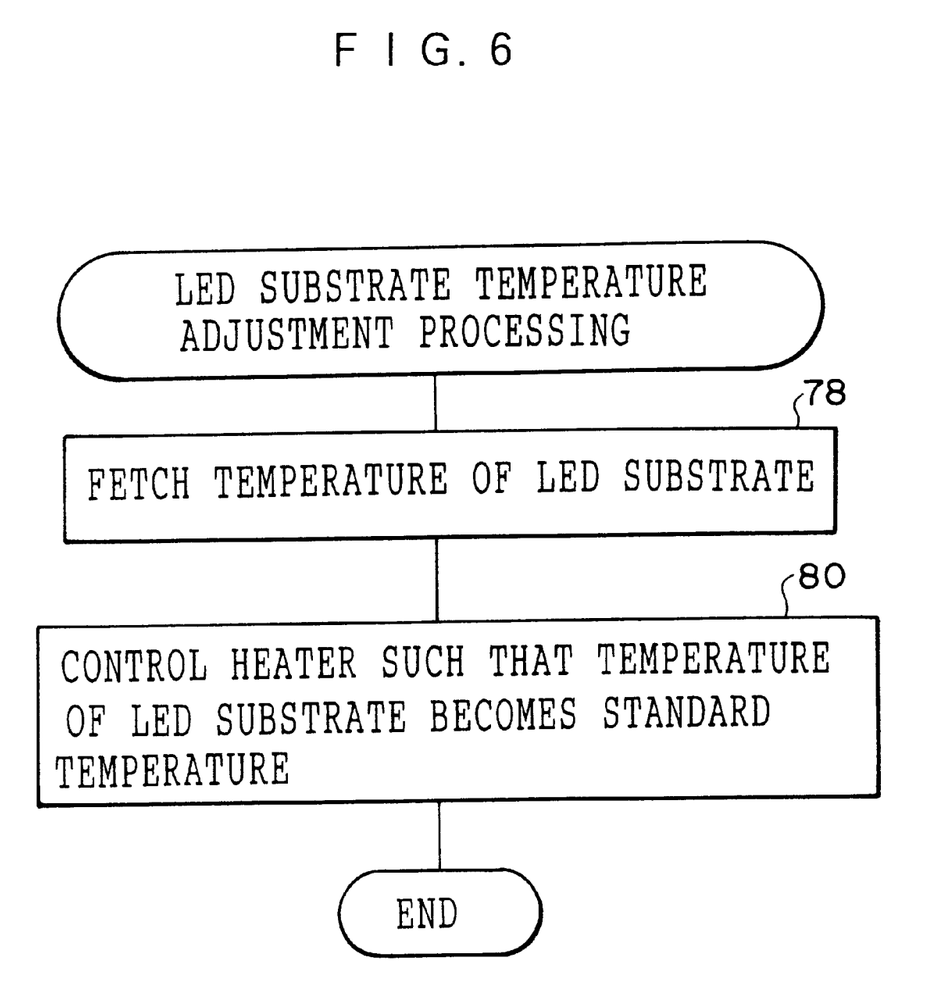
FIG. 6 is a flowchart illustrating a routine of processing for adjusting a temperature of an LED substrate.

The LEDs emit R light, G light and B light. In order for the wavelengths of the respective color lights to become desired wavelengths, the temperature of the substrate on which the LEDs are mounted must be a standard temperature. Namely, if the temperature of the substrate to which the LEDs are mounted fluctuates from the standard temperature, the wavelengths of the emitted color lights will deviate from the wavelengths at the time the substrate is at the standard temperature, and the photoelectric conversion efficiency, i.e., the emitted light amount, will also deviate from the standard amount thereof. Thus, in the present embodiment, each time a predetermined amount of time elapses, the LED substrate temperature adjustment processing illustrated in FIG. 6 is carried out. Namely, in step 78, the temperature of the substrate to which the LEDs are mounted, which temperature is detected by the temperature sensor 30, is fetched. In step 80, on the basis of the fetched temperature, the heater 32 is controlled such that the temperature of the substrate to which the LEDs are mounted becomes the standard temperature. In the present embodiment, the standard temperature is a temperature which the substrate does not reach even if the RGB LED array 14 is continually operated. Accordingly, in the present embodiment, the substrate is heated by the heater so that the temperature of the substrate becomes the standard temperature. Further, the standard temperature may be a temperature which the substrate reaches when the RGB LED array 14 is operated continually. In this case, a device having cooling and heating functions may be used to control the temperature of the substrate to the standard temperature.

Next, a second embodiment of the present invention will be described. Because the present second embodiment is structured substantially similarly to the above-described first embodiment, only those portions which differ will be described, and description of the same portions will be omitted.

Figure 7:
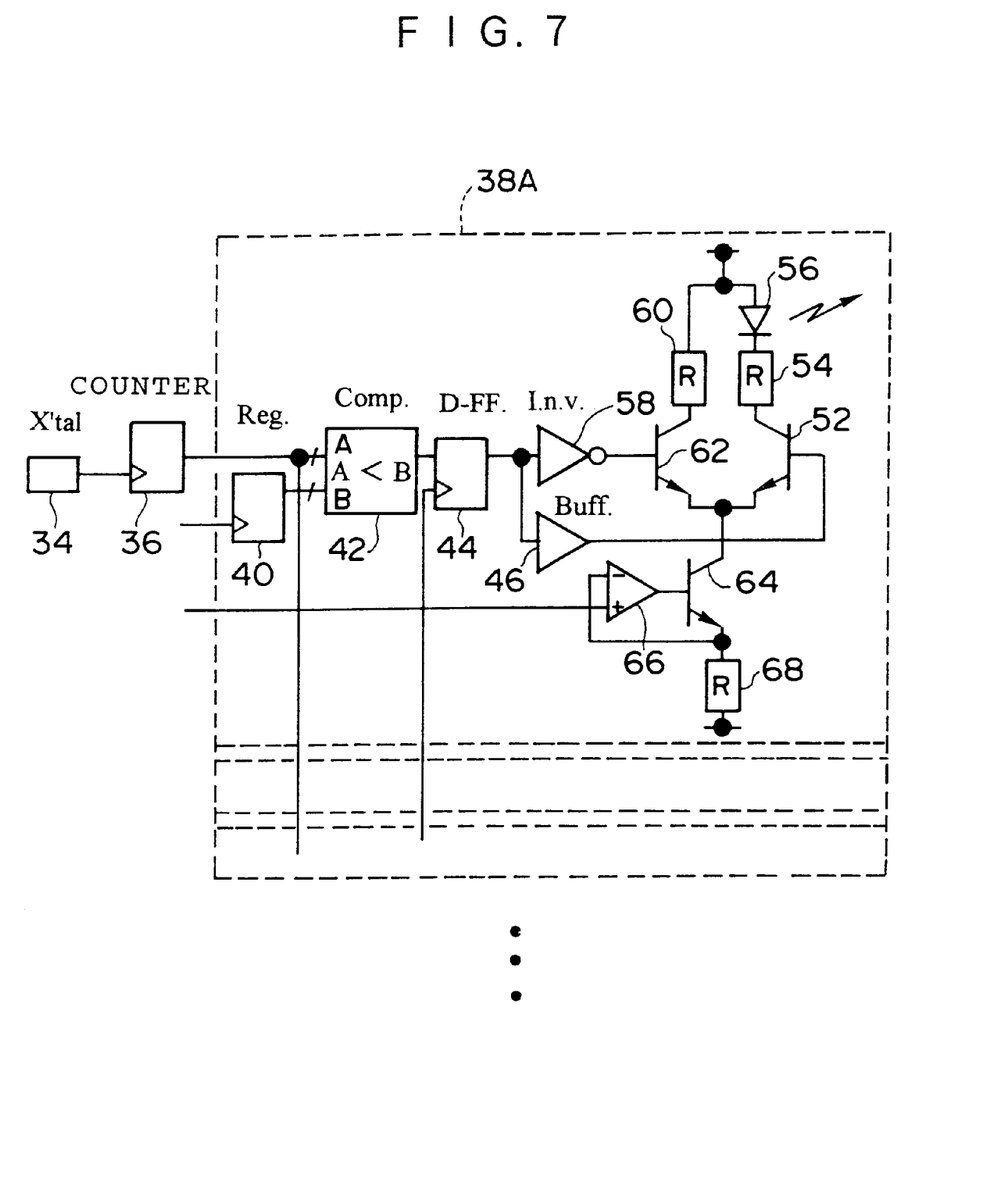
FIG. 7 is a circuit diagram of an LED driving circuit in an image reading device relating to a second embodiment.

As illustrated in FIG. 7, a PWM modulating circuit 38A relating to the present second embodiment includes a transistor 62 whose base is connected to the D-FF 44 via an inverter 58. The collector of the transistor 62 is connected to the power source side of the LED 56 via a resistor 60. The emitter of the transistor 62 is connected to the emitter of the transistor 52. Namely, the LED driving transistors 62 and 52 operate exclusively. That is, when one of the pair of transistors is on, the other one of the pair is off. The collector of a transistor 64 is connected to the emitters of the transistor 62 and the transistor 52. The base of the transistor 64 is connected to the output terminal of an operational amplifier 66. The emitter of the transistor 64 is connected to the minus input terminal of the operational amplifier 66 and resistor 78, and the plus input terminal is connected to the controller 26. Namely, the electric potential of the emitter of the transistor 64 is controlled to be an electric potential set by the controller 26.

Figure 8:
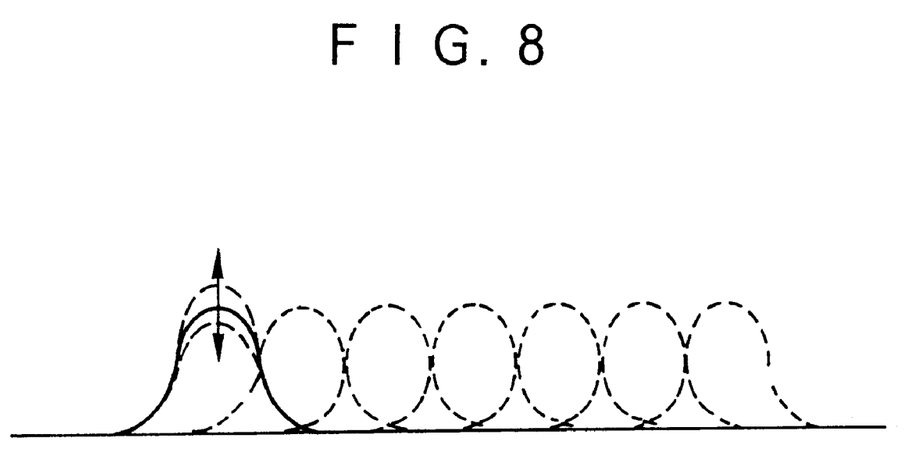
FIG. 8 is a schematic view illustrating output of a CCD at the time the color balance and light distribution of respective LEDs are adjusted, which processing is carried out in the second embodiment in a state in which there is no transparency.

In the above described first embodiment, the charge accumulating times of the three-line CCD sensor and the pulse widths of the respective LEDs are adjusted so that the received amounts of light of the respective CCDs are desired received amounts of light. However, the present invention is not limited to the same. In the present second embodiment, the charge accumulating times of the three-line CCD sensor, the pulse widths of the respective LEDs, and the driving currents of the respective LEDs are adjusted. In this way, as illustrated in FIG. 8, the amounts of light received by the CCDs increase and decrease to become the desired amounts of received light. Further, it is possible to adjust at least one of the charge accumulating times of the three-line CCD sensor, the pulse widths of the respective LEDs and the driving currents of the respective LEDs.

Namely, on the basis of the density of the image frame, the controller 26 computes values of the charge accumulating times of the three-line CCD sensor, the pulse widths of the respective LEDs and the driving currents of the respective LEDs, which values allow the amounts of light received by the CCDs to become desired amounts of received light. The controller 26 effects control such that the charge accumulating times of the three-line CCD sensor, the pulse widths of the respective LEDs and the driving currents of the respective LEDs become the computed values. Namely, the electric potential for the driving currents to become the computed values is set at the operational amplifier 66.

Also at the time of adjusting the color balance and the light distribution, it is possible to compute values of the charge accumulating times of the three-line CCD sensor, the pulse widths of the respective LEDs and the driving currents of the respective LEDs, and to effect control such that the charge accumulating times, the pulse widths and the driving currents become the computed values, so that the color balance and the light distribution fall within allowable ranges. Further, in the present embodiment as well, the LED substrate temperature adjusting processing illustrated in FIG. 6 may be carried out.

In the above-described first and second embodiments, examples are described of cases in which CCD elements are used as the light sensors. However, the present invention is not limited to the same, and a fixed pick-up device such as a MOS-type pick-up sensor or the like may be utilized.

Moreover, in the above description, a negative film is used as an example, but the present invention is not limited to the same. The original in the present invention may be a transparency other than a film image recorded on a photographic film, or, the present invention may be applied to a film reading device such as, for example, a telecine converter. Further, a reflection original, such as an image recorded on a medium having low or no light transmittance (e.g., regular paper) may be used. In this case, when the color balance and the light distribution are adjusted, for example, the light reflected off of a white reference plate may be read, and control may be effected as described above.

As described above, in the present invention, both, on the one hand, a light receivable time and a turning on-and-off period are controlled such that the period for turning each light emitting element on and off is 1/n (n is an integer) of a predetermined minimum charge accumulating time and the light receivable time of the light sensor is a time which is greater than or equal to the minimum charge accumulating time and is an amount of time over which light, of an amount generated by a light emitting element being turned on a number of times which is an integer, can be received. Therefore, the degrees of freedom in control at the time of reading are increased, and fine control can be carried out.

What is claimed is:

1. An image reading device comprising:

a light source which illuminates an image and which is formed by a plurality of light emitting elements which emit light of different wavelengths;

a plurality of light sensors which receive light from the image and which are formed by a plurality of light receiving elements which receive light from the light source; and control means for controlling the light sensors by using a predetermined minimum charge accumulating time as a unit such that the light sensors receive light from the image during a light receivable time which is an integer multiple of the minimum charge accumulating time, and for controlling the respective light emitting elements such that the respective light emitting elements are pulse width modulated synchronously with the light receivable time and such that one period thereof equals the minimum charge accumulating time, and emit light.

2. An image reading device according to claim 1, wherein said light sensors receive lights of different wavelengths, and on a basis of output from the plurality of light sensors in a state in which there is no original, in a case in which transmitted light from the image is to be read, and on the basis of output from the plurality of light sensors when a reference plate of a predetermined color is set in place of the image, in a case in which light reflected from the image is to be read, the control means computes a target value of at least one of a light receivable time of each of the plurality of light sensors and a light emitting pulse width of each of the plurality of light emitting elements, such that color balance and light distribution of each of the plurality of light emitting elements fall within allowable ranges, and the control means effects control such that the at least one of the light receivable time of each of the plurality of light sensors and the light emitting pulse width of each of the plurality of light emitting elements becomes a computed target value.

3. An image reading device according to claim 1, wherein the control means a driving current of each of the plurality of light emitting elements.

4. An image reading device according to claim 3, wherein said light sensors receive lights of different wavelengths, and a basis of output from the plurality of light sensors in a state in which there is no image, a case in which transmitted light from the image is to be read, and on the basis of output from the plurality of light sensors when a reference plate of a predetermined color is set in place of the image, in a case in which light reflected from the image is to be read, the control means computes a target value of at least one of a driving current of each of the plurality of light emitting elements, a light receivable time of each of the plurality of light sensors and a light emitting pulse width of each of the plurality of light emitting elements, such that color balance and light distribution of each of the plurality of light emitting elements fall within allowable ranges, and the control means effects control such that the at least one of the driving current of each of the plurality of light emitting elements, the light receivable time of each of the plurality of light sensors and the light emitting pulse width of each of the plurality of light emitting elements becomes a computed target value.

5. A image reading device according to claim 3, wherein the control means controls the light receivable time of each of the plurality of light sensors, a light emitting pulse width of each of the plurality of light emitting elements, and the driving current of each of the plurality of light emitting elements, such that an amount of light received from the original by each of the plurality of light sensors becomes a desired amount of light received.

6. An image reading device according to claim 1, wherein the control means controls the light receivable time of each of the plurality of light sensors and a light emitting pulse width of each of the plurality of light emitting elements, such that an amount of light received from the original by each of the plurality of light sensors becomes a desired amount of light received.

7. An image reading device according to claim 1, wherein the light source is formed by the light emitting elements being arranged on a substrate, and the image reading device further comprises:

detecting means for a temperature of the substrate; and temperature changing means for changing the temperature of the substrate, wherein on a basis of the temperature detected by the detecting means, the control means controls the temperature changing means such that the temperature of the substrate becomes a standard temperature.

8. An image reading device according to claim 1, wherein the light emitting elements are light emitting diodes.

9. An image reading device comprising:

a light source which illuminates an image and which is formed by a plurality of light emitting elements which emit light;

a light sensor which receives light from the image; and control means for controlling a light receivable time and a turning on-and-off period such that the period for turning each light emitting element on and off is 1/n, n being an integer, of a predetermined minimum charge accumulating time and the light receivable time of the light sensor is a time which is greater than or equal to the minimum charge accumulating time and is an amount of time over which light, of an amount generated by a light emitting element being turned on a number of times which is an integer, can be received.

10. An image reading device according to claim 9, wherein said control means computes a target value of at least one of the light receivable time of the light sensor and a light emitting pulse width of each of the light emitting elements, and controls the light receivable time and the turning on-and-off period such that the at least one of the light receivable time of the light sensor and the light emitting pulse width of each of the light emitting elements becomes a computed target value.

11. An image reading device according to claim 9, wherein said control means is structured so as to be able to control driving current to the light emitting elements.

* * * * *

UNITED STATES PATENT AND TRADEMARK OFFICE
CERTIFICATE OF CORRECTION

PATENT NO.   : 6,386,452 B1
DATED        : May 14, 2002
INVENTOR(S)  : Kazushige Kawamura It is certified that error appears in the above-identified patent and that said Letters Patent is hereby corrected as shown below:

<u>Title page,</u>
Item [56], References Cited, FOREIGN PATENT DOCUMENTS, delete "JP 411-112732" and insert -- JP 11-112732 --.

Signed and Sealed this

Twelfth Day of November, 2002

*Attest:*

*Attesting Officer*

JAMES E. ROGAN
*Director of the United States Patent and Trademark Office*